US007906927B2

(12) United States Patent
Kato et al.

(10) Patent No.: US 7,906,927 B2
(45) Date of Patent: Mar. 15, 2011

(54) SIGNAL INPUT METHOD AND OPENING/CLOSING CONTROLLER

(75) Inventors: Masayuki Kato, Kanagawa (JP); Kazushi Hirose, Kanagawa (JP); Yoshihiro Fujimura, Osaka (JP); Minoru Tanaka, Osaka (JP); Takao Koba, Osaka (JP); Hiroki Nishida, Osaka (JP)

(73) Assignees: Shiroki Kogyo Co., Ltd., Kanagawa (JP); Tachibana Eletech Co., Ltd., Osaka (JP)

( * ) Notice: Subject to any disclaimer, the term of this patent is extended or adjusted under 35 U.S.C. 154(b) by 411 days.

(21) Appl. No.: 12/162,828

(22) PCT Filed: Dec. 26, 2006

(86) PCT No.: PCT/JP2006/325888

§ 371 (c)(1),
(2), (4) Date: Jul. 31, 2008

(87) PCT Pub. No.: WO2007/088693

PCT Pub. Date: Aug. 9, 2007

(65) Prior Publication Data

US 2009/0009120 A1 Jan. 8, 2009

(30) Foreign Application Priority Data

Feb. 3, 2006 (JP) ................................ 2006-027168

(51) Int. Cl.
*H02H 7/085* (2006.01)

(52) U.S. Cl. ........ 318/434; 318/282; 318/283; 318/286; 703/7; 703/48

(58) Field of Classification Search .................. 318/434, 318/282, 283, 286, 266, 280, 445, 466; 703/7, 703/48

See application file for complete search history.

(56) References Cited

U.S. PATENT DOCUMENTS

| | | | | |
|---|---|---|---|---|
| 6,426,604 | B1 * | 7/2002 | Ito et al. | 318/466 |
| 6,573,677 | B2 * | 6/2003 | Gerbetz | 318/445 |
| 7,023,161 | B2 * | 4/2006 | Iwasaki et al. | 318/466 |
| 7,095,200 | B2 * | 8/2006 | Shinohara et al. | 318/469 |
| 7,259,532 | B2 * | 8/2007 | Shinohara | 318/282 |
| 7,268,506 | B2 * | 9/2007 | Nakagawa et al. | 318/280 |
| 7,570,001 | B2 * | 8/2009 | Noro et al. | 318/286 |
| 7,668,690 | B2 * | 2/2010 | Schneider et al. | 702/145 |
| 2006/0038519 | A1 * | 2/2006 | Nakagawa et al. | 318/280 |
| 2006/0061314 | A1 * | 3/2006 | Shinohara et al. | 318/466 |

(Continued)

FOREIGN PATENT DOCUMENTS

JP 10-018700 1/1998

(Continued)

*Primary Examiner* — Paul Ip

(74) *Attorney, Agent, or Firm* — Finnegan, Henderson, Farabow, Garrett & Dunner, L.L.P.

(57) ABSTRACT

It is intended to realize a signal input method which makes it possible to add another method to an existing method later in a simple manner as well as an opening/closing controller which employs two methods and can be constructed by adding another method to an existing method in a simple manner. A signal processing circuit (5) is inserted in an auto signal path of a control circuit (1) which performs opening/closing control with a pinch preventing function on the basis of an auto signal (AUTO), a close signal (UP), and an open signal (DOWN) which are input via respective signal paths. The auto signal and a detection signal of an additional pinch sensor are input to the control circuit via the signal processing circuit in the form of serial signals.

4 Claims, 1 Drawing Sheet

U.S. PATENT DOCUMENTS

2006/0111826 A1* 5/2006 Akiyama ........................ 701/48
2007/0119100 A1* 5/2007 Nakada et al. .................. 49/350
2008/0036406 A1* 2/2008 Kawai et al. .................. 318/283
2008/0037504 A1* 2/2008 Jeon et al. ..................... 370/342
2008/0111509 A1* 5/2008 Kunkel ......................... 318/286
2008/0234894 A1* 9/2008 Nomura et al. ................. 701/36
2009/0021190 A1* 1/2009 Shibata ........................... 318/14
2009/0254300 A1* 10/2009 Schneider et al. ............ 702/145
2009/0281779 A1* 11/2009 Kajitani et al. .................. 703/7

FOREIGN PATENT DOCUMENTS

JP 10-018704 1/1998
JP 10-258634 9/1998
JP 2005-023701 1/2005
JP 3708393 8/2005
JP 2005-314949 11/2005

* cited by examiner

SIGNAL INPUT METHOD AND OPENING/CLOSING CONTROLLER

CROSS REFERENCE TO RELATED APPLICATIONS

This application is a national phase application based on PCT/JP2006/325888, filed Dec. 26, 2006, which claims the priority of Japanese Patent Application No. 2006-027168, filed Feb. 3, 2006, the content of all of which is incorporated herein by reference.

TECHNICAL FIELD

The present invention relates to a signal input method and an opening/closing controller. More particularly, the invention relates to a method for inputting a detection signal of an additional pinch sensor to a control circuit which performs opening/closing control with a pinch preventing function as well as to an opening/closing controller having a control circuit to which a detection signal of an additional pinch sensor is input.

BACKGROUND ART

Opening/closing control with a pinch preventing function is performed for power windows of automobiles etc. Whether a pinch has occurred or not is judged on the basis of the load state of a motor that drives a windowpane. A judgment that a pinch has occurred is made when the load has exceeded a limit, whereupon the movement of the windowpane is reversed (refer to Patent document 1, for example).

Another method is known in which pinch detection is performed by a capacitance sensor. This method enables more sensitive pinch detection than the load method because in a sense the capacitance sensor functions as a touch sensor (refer to Patent document 2, for example).

Patent document 1: JP-A-2005-23701

Patent document 2: JP-A-2005-314949

DISCLOSURE OF THE INVENTION

Problems to Be Solved by the Invention

The safety of a power window can further be increased by employing the above two methods. One method for implementing an opening/closing controller that employs both methods is to add the touch sensor method to the existing load method later. In this case, it is desirable that the additional part be added later with minimum alterations to the existing part.

An existing opening/closing controller has a basic configuration as shown in FIG. 2. That is, a main ECU (electronic control unit) 2 performs power window opening/closing control with a pinch preventing function on the basis of an auto signal, an up signal, and a down signal that are input from a switch 4. Pinch detection is performed by the load method. The main ECU 2 is implemented by an LSI or the like.

The switch 4 is a switch that is manipulated by a user. The auto signal, the up signal, and the down signal are input to the corresponding ports of the main ECU 2 via signal lines, respectively. The auto signal is a signal that commands an opening/closing control with a pinch preventing function. The up signal is a signal that commands closing of the window. The down signal is a signal that commands opening of the window.

It is desirable that the touch sensor method or the like be added later with minimum alterations to the above basic configuration. In particular, as for the main ECU, it is required to use the existing ports and not to necessitate addition of new ports.

An object of the present invention is therefore to realize a signal input method which makes it possible to add another method to an existing method later in a simple manner as well as an opening/closing controller which employs two methods and can be constructed by adding another method to an existing method in a simple manner.

Means for Solving the Problems

An aspect of the invention recited in claim 1, which has been made to attain the above object, is a signal input method characterized in that a signal processing circuit is inserted in an auto signal path of a control circuit which performs opening/closing control with a pinch preventing function on the basis of an auto signal, a close signal, and an open signal which are input via respective signal paths; and that the auto signal and a detection signal of an additional pinch sensor are input to the control circuit via the signal processing circuit in the form of serial signals.

Another aspect of the invention recited in claim 2, which has been made to attain the above object, is a signal input method which is based on the signal input method recited in claim 1 and is characterized in that the close signal and the open signal are also input to the signal processing circuit.

Still another aspect of the invention recited in claim 3, which has been made to attain the above object, is an opening/closing controller having a control circuit which performs opening/closing control with a pinch preventing function on the basis of an auto signal, a close signal, and an open signal which are input via respective signal paths, characterized by comprising a signal processing circuit which is inserted in a signal path of the auto signal, and which inputs the auto signal and a detection signal of an additional pinch sensor to the control circuit in the form of serial signals.

A further aspect of the invention recited in claim 4, which has been made to attain the above object, is an opening/closing controller which is based on the opening/closing controller recited in claim 3 and is characterized in that the close signal and the open signal are also input to the signal processing circuit.

ADVANTAGES OF THE INVENTION

In the aspect of the invention recited in claim 1, a signal processing circuit is inserted in an auto signal path of a control circuit which performs opening/closing control with a pinch preventing function on the basis of an auto signal, a close signal, and an open signal which are input via respective signal paths; and the auto signal and a detection signal of an additional pinch sensor are input to the control circuit via the signal processing circuit in the form of serial signals. Therefore, a signal input method can be provided which makes it possible to add another method to an existing method later in a simple manner.

In the aspect of the invention recited in claim 2, the close signal and the open signal are also input to the signal processing circuit. Therefore, also the signal processing circuit side can refer to the close signal and the open signal.

In the aspect of the invention recited in claim 3, in an opening/closing controller having a control circuit which performs opening/closing control with a pinch preventing function on the basis of an auto signal, a close signal, and an open signal which are input via respective signal paths, a signal processing circuit is provided which is inserted in a signal path of the auto signal and which inputs the auto signal and a detection signal of an additional pinch sensor to the control circuit in the form of serial signals. Therefore, an opening/closing controller can be provided which employs two methods and can be constructed by adding another method to an existing method later in a simple manner.

In the aspect of the invention recited in claim 4, the close signal and the open signal are also input to the signal processing circuit. Therefore, also the signal processing circuit side can refer to the close signal and the open signal.

DESCRIPTION OF SYMBOLS

1: Main ECU
3: Switch
5: Sensor ECU

BEST MODE FOR CARRYING OUT THE INVENTION

Figure 1:
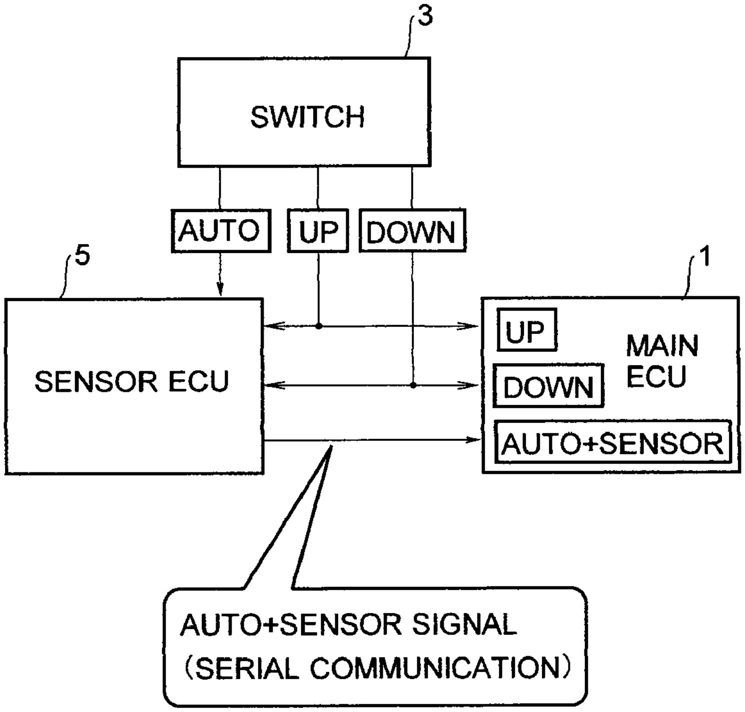
FIG. 1 is a block diagram of an opening/closing controller according to an example of the best mode for carrying out the invention.

The best mode for carrying out the present invention will be hereinafter described in detail with reference to the drawings. The invention is not limited to the best mode for carrying out it. FIG. 1 is a block diagram of an example power window opening/closing controller. This apparatus is an example of the best mode for carrying out the invention. The configuration of this apparatus shows an example of the best mode for carrying out that aspect of the invention which relates to the opening/closing controller. A method relating to this apparatus shows an example of the best mode for carrying out that aspect of the invention which relates to the signal input method.

Figure 2:
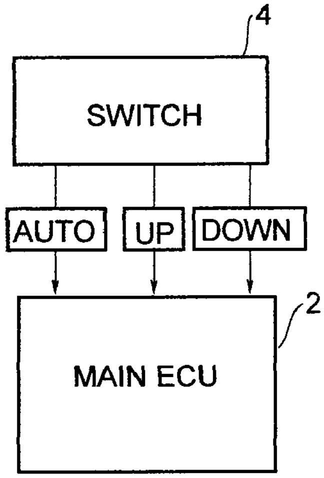
FIG. 2 shows the basic configuration of an existing controller.

As shown in FIG. 1, this apparatus is equipped with a main ECU 1 and a switch 3. The main ECU 1 is a control circuit which controls the opening/closing of a power window with a pinch preventing function. The main ECU 1 is implemented by an LSI or the like. The main ECU 1 is equipped with a means for detecting a pinch by the load method or the like. The pinch detection method is not limited to the load method. The main ECU 1 corresponds to the main ECU 2 of the existing opening/closing controller shown in FIG. 2. The main ECU 1 is an example of the control circuit of the invention.

The switch 3 is a switch that is manipulated by a user, and generates an auto signal, an up signal, and a down signal. The switch 3 corresponds to the switch 4 of the existing opening/closing controller shown in FIG. 2.

The auto signal is a signal that commands an opening/closing control with a pinch preventing function. The up signal is a signal that commands closing of the window. The down signal is a signal that commands opening of the window. The auto signal, the up signal, and the down signal are examples of the auto signal, the close signal, and the open signal of the invention, respectively.

This apparatus is also equipped with a sensor ECU 5. The sensor ECU 5 is implemented by an LSI or the like. The sensor ECU 5 is an example of the signal processing circuit of the invention. The sensor ECU serves to input a detection signal of an additional pinch sensor to the main ECU 1. For example, a touch sensor is used as the additional pinch sensor. The touch sensor performs pinch detection using capacitance or the like. The additional pinch sensor is not limited to a touch sensor. In the following, a detection signal of the additional pinch sensor is also called an additional pinch detection signal or a sensor signal.

The sensor ECU 5 is provided in a signal path for the auto signal between the switch 3 and the main ECU 1. The sensor ECU 5 relays an auto signal coming from the switch 3 to the main ECU 1 and inputs an additional pinch detection signal to the main ECU 1.

The auto signal and the additional pinch detection signal are converted by the sensor ECU 5 into serial signals, which are input to the main ECU 1. The additional pinch detection signal is a detection signal of the additional pinch sensor. A pinch prevention control signal that is associated with the pinch detection may be input instead of the pinch detection signal.

An up signal and a down signal coming from the switch 3 are input to both of the main ECU 1 and the sensor ECU 5. The main ECU 1 closes and opens the window on the basis of the up signal and the down signal, respectively. The sensor ECU 5 uses the up signal and the down signal as reference signals.

Configured in the above-described manner, in an auto mode, the main ECU 1 performs an opening/closing control with a pinch preventing function on the basis of not only pinch detection performed by itself but also pinch detection performed by the additional pinch sensor.

Therefore, where the additional pinch sensor is a touch sensor, the pinch prevention can be performed with high sensitivity and hence the safety of the power window is increased. Furthermore, since the above opening/closing controller can be constructed in a simple manner by adding the sensor ECU later in the path of the auto signal of the existing apparatus, alterations to the existing apparatus are minimal. In addition, even if the sensor ECU which is added later fails, the manual windowpane elevating/lowering function is not lost because a close signal (up signal) and an open signal (down signal) are input to the main ECU via lines that are directly connected to it.

The opening/closing controller for an automobile power window has been described above. However, the use of the opening/closing controller according to the invention is not limited to a power window, and the opening/closing controller according to the invention can also be applied to the control of a member having a structure that an opening is closed by a movable plate, such as a sunroof, a sunshade, a slide door, and a back door.

The invention claimed is:

1. A signal input method characterized in:

that a signal processing circuit is inserted in an auto signal path of a control circuit which performs opening/closing control with a pinch preventing function on the basis of an auto signal, a close signal, and an open signal which are input via respective signal paths; and that the auto signal and a detection signal of an additional pinch sensor are input to the control circuit via the signal processing circuit in the form of serial signals.

2. The signal input method according to claim 1, characterized in that the close signal and the open signal are also input to the signal processing circuit.

3. An opening/closing controller having a control circuit which performs opening/closing control with a pinch preventing function on the basis of an auto signal, a close signal, and an open signal which are input via respective signal paths, characterized by comprising:

a signal processing circuit which is inserted in a signal path of the auto signal, and which inputs the auto signal and a detection signal of an additional pinch sensor to the control circuit in the form of serial signals.

4. The opening/closing controller according to claim 3, characterized in that the close signal and the open signal are also input to the signal processing circuit.

* * * * *